Nov. 9, 1926. 1,606,597
C. PETERSON
BRAKING SYSTEM FOR AUTOMOTIVE VEHICLES
Filed Sept. 28, 1925
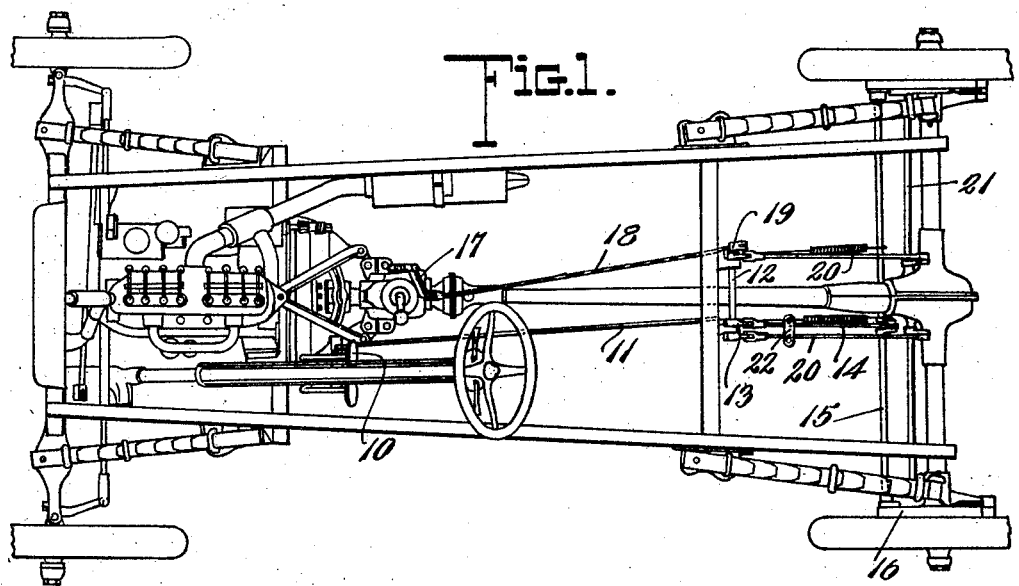
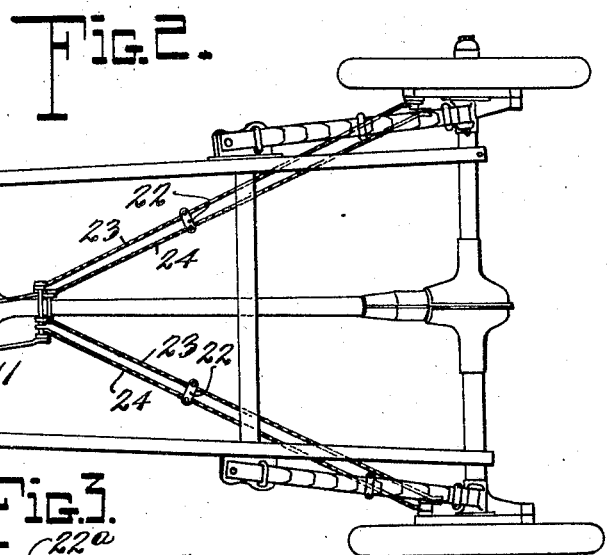
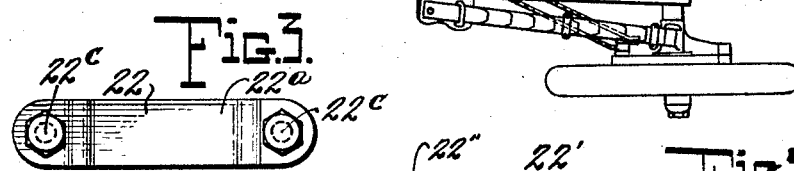
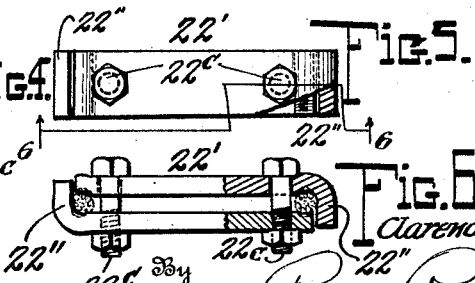
Inventor
Clarence Peterson
By Robb Robb & Hill
Attorneys Patented Nov. 9, 1926.

1,606,597

UNITED STATES PATENT OFFICE.

CLARENCE PETERSON, OF WASHINGTON, DISTRICT OF COLUMBIA.

BRAKING SYSTEM FOR AUTOMOTIVE VEHICLES.

Application filed September 28, 1925. Serial No. 59,131.

The present invention appertains to improvements in braking system for automotive vehicles.

It is well known that such vehicles today are conventionally provided with two independent braking systems, one of which "the service" is operated by the foot pedal, and the other of which "the emergency" is applied by means of a manually operated lever. Each of these systems includes a brake member, one internally, and the other externally, acting upon a drum carried by the vehicle wheel, and I have found by experience both in operation of such vehicles and in the repair thereof that the effectiveness of the individual braking instrumentalities in a large majority of automobiles, particularly of the less expensive type, is very quickly reduced as use proceeds; in fact the systems become dangerously inadequate. In the main this is due to the small braking surfaces provided by the construction and to the frequency of forcible and sudden applications in traffic conditions of today and under operation at high speeds of the vehicle with improved road conditions. Not infrequently excessive strain is produced when a sudden and forcible application of one of the brake devices is employed, resulting in a breakage and failure of the brake operation.

This difficulty and the likelihood of accident is at times capable of being prevented by quick thinking on the part of the operator by the application of the other brake device or system. However, it is unusual for an operator of a vehicle unless particularly trained to do so, to be skillful enough to apply both the service and emergency brakes under these or all conditions, and especially is this difficult when it is considered that the operator must remove one hand from the control of the steering wheel in order to make application of the emergency system.

In addition to this, the service or foot brake is very much more used than the emergency brake and in consequence the wear on the former is very much greater than on the latter which is one cause for the vast number of failures of the service brake and the necessity for constant adjustment of the same in the present use of automobiles.

It is with these conditions in mind that I have devised a method and means of increasing very materially the effectiveness of braking operation with the known systems by the utilization of means to operatively connect the actuating means for the brake members, such that both the internal and external members are simultaneously applied at each operation regardless of whether the operator employs the foot or hand lever actuator.

More specifically stated, my invention resides in the provision of a connecting device with the braking systems, applied between the actuators for the respective braking devices and said devices themselves.

Other objects and advantages of the invention will be hereinafter set forth and the novel features thereof defined by the appended claims.

In the drawings:

Figure 1 is a plan view of an automobile construction with the body removed to disclose more clearly the braking systems utilized;

Figure 2 is a similar view wherein the braking systems include cable connections between the actuators and the brake elements;

Figures 3 and 4 are side elevation and top plan views, respectively, of a clamping device for connecting the actuating means for the brake elements together;

Figure 5 is a side elevation of a slightly modified form of clamping device; and Figure 6 is a section on the line 6—6 of Figure 5.

Like reference numerals designate corresponding parts throughout the several figures of the drawings.

Referring to the embodiment disclosed in Figure 1 of the drawing, 10 designates the foot pedal or service brake actuator, and 11 the rod connection which extends therefrom to the brake cross shaft 12. This shaft is provided with an arm 13 which in turn is connected by the equalizer rods 14 to the service brake shaft 15. This latter shaft, as well known by those skilled in the art to which this invention relates, effects operation of the external brake bands 16 on the rear wheel drums.

The second brake system includes the emergency brake lever 17, the cable connection 18 to the arm 19, and the equalizer rods 20 extending to the transverse emergency brake shaft 21. The opposite ends of this shaft carry the instrumentalities, not shown, which effect the application of the internal brakes on the rear brake drums. Upon the contiguous equalizer rods 14 and 20 of these respective braking systems I secure the clamp 22 which is shown more in detail in Figures 3 and 4 of the drawings. This clamp may be of any desired form or construction but as illustrated consists of a pair of correspondingly formed plates 22ª each of which is preferably formed adjacent to each end with a rod receiving seat 22ᵇ and with apertures to accommodate the clamping bolts 22ᶜ. These clamping devices may be modified to accord with the construction shown in Figures 5 and 6, wherein the clamping plates 22′ are formed at opposite ends with bent extremities 22″ for engagement about the actuating connection in the manner more particularly disclosed in Figure 6.

Referring to Figure 2 of the drawing, the braking systems are slightly modified in that they are each provided with a cable connection 23, 24 extending from the foot pedal and the hand lever to the brake members coacting with the respective wheel drums. This is a type of system in use today as a modification of the form disclosed in Figure 1, and in this form a clamping device 22 is connected to each pair of cables extending rearwardly of the actuators as shown.

It will be obvious that when either the foot pedal 10 or hand lever 17 is operated the brake application is effected both internally and externally of the drum in view of the connection by the clamping members 22 between the connections from the actuators to the respective brake elements. It will also be noted that the brake pedal or service brake may be applied without effecting any movement of the hand lever in view of the flexible connection which is provided between the latter lever and the cross shaft in that form of the system disclosed in Figure 1, and similarly in view of the use of the corresponding flexible connection in the system shown in Figure 2. In other words, in those systems wherein rod connections are provided between the hand and foot levers and the brake instrumentalities, the operation of one of the brake members would necessarily be accompanied by an operation of the other brake actuator but in both instances where either the clamping members or rod connections are employed both the external and internal brake members will be applied at each operation.

It will be obvious from the foregoing that the life of the brake members themselves will be radically prolonged by virtue of the lessening of the strains in each application of the brakes and a distribution of the brake stresses acting in opposed relation to each other on the brake drums themselves. A very cheap method of securing this double brake action is provided by the utilization of the simple clamp device in combination with the brake actuators as described and no modification is required of the braking systems provided by the manufacturer to accomplish the desired results. It is of course feasible to provide as a unit accessory a clamp device and a piece of cable of the necessary length depending upon the make of machine, to enable the application of this dual braking system to the standard make of automobiles which may include rod actuator connections between the brake actuators, and the brake elements.

While the specific construction of my invention has been herein shown and described, it is to be understood that changes and alterations may be made therein without departing from the spirit of the invention as defined by the following claims.

Having thus described my invention, what I claim as new and desire to secure by Letters Patent is:

1. In combination, a pair of brake actuating members, and a connecting device therefor comprising a pair of complemental plates disposed at opposite sides of and embracing the actuating members aforesaid to cause joint action of the same, and clamping bolts extending through said plates.

2. In a vehicle brake system, the combination with separate brake members, separate actuators for said members, parallel operating members extending from said actuators to said brakes, of a clamp device rigidly connecting the parallel members together whereby to produce simultaneous movement of the brakes upon operation of either of the actuators therefor.

In testimony whereof I affix my signature.

CLARENCE PETERSON.